United States Patent
Moyer

(10) Patent No.: US 7,555,605 B2
(45) Date of Patent: Jun. 30, 2009

(54) DATA PROCESSING SYSTEM HAVING CACHE MEMORY DEBUGGING SUPPORT AND METHOD THEREFOR

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 306 days.

(21) Appl. No.: 11/536,085

(22) Filed: Sep. 28, 2006

(65) Prior Publication Data

US 2008/0082720 A1    Apr. 3, 2008

(51) Int. Cl.
*G06F 12/00* (2006.01)
(52) U.S. Cl. ............... 711/118; 711/206; 712/205; 717/129
(58) Field of Classification Search ........... 711/118
See application file for complete search history.

(56) References Cited

U.S. PATENT DOCUMENTS

| | | | |
|---|---|---|---|
| 5,636,363 A | 6/1997 | Bourekas et al. | |
| 6,016,555 A * | 1/2000 | Deao et al. | 714/35 |
| 6,044,478 A | 3/2000 | Green | |
| 6,260,131 B1 * | 7/2001 | Kikuta et al. | 711/210 |
| 6,321,329 B1 * | 11/2001 | Jaggar et al. | 712/227 |
| 6,954,826 B2 | 10/2005 | Moyer | |
| 7,346,744 B1 * | 3/2008 | Glasco | 711/141 |
| 2006/0271919 A1 * | 11/2006 | Moyer | 717/136 |

* cited by examiner

*Primary Examiner*—Kevin L Ellis
*Assistant Examiner*—Matthew Bradley
(74) *Attorney, Agent, or Firm*—Daniel D. Hill; Joanna G. Chiu

(57) ABSTRACT

A data processing system having debugging circuitry and a method for operating the data processing system is provided. In the system, a processor has a cache memory and is coupled to a system bus. An instruction is received which indicates an effective address. The instruction is executed and it is determined if the effective address results in a hit or a miss in the cache. If the effective address results in a hit, data associated with the effective address is provided from the cache to the system bus without modifying a state of the cache. The instruction allows real-time debugging circuits to be able to view the current value of one or more variables in memory that may be hidden from access due to cache hierarchy without modifying the value or impacting the current state of the cache.

22 Claims, 2 Drawing Sheets

DATA PROCESSING SYSTEM HAVING CACHE MEMORY DEBUGGING SUPPORT AND METHOD THEREFOR

FIELD OF THE INVENTION

The present invention relates generally to data processing, and more particularly, to a data processing system having cache memory debugging support and method therefor.

RELATED ART

Data processing systems typically include debug circuitry to permit a programmer to determine various values within the system at different points in time. Some data processing systems allow the debug circuitry to operate in near "real-time". Currently in real-time debugging, if a variable is cached, the debug circuitry has no easy access to the latest value of the variable without a very intrusive set of operations to cause a central processing unit (CPU) in the system to be halted and the value extracted from the cache via execution of multiple instructions including load and store instructions passed in through a JTAG (Joint Test Action Group) port or other debug interface. This may cause undesirable state changes within the cache memory. Also, the load and store instructions can cause additional message generation for real-time debug trace units, in order to expose the variable, which may result in a bandwidth issue. In addition, the problem is more acute if a cache hierarchy exists between the CPU and the debug circuitry. Further, because current intrusive methods of determining cache values affect the state of the cache, particular debugging issues may not be exposed in the same manner due to differences in the cache and system state caused by the debugging operation, and may even hide the problem being debugged.

Therefore, there is a need for a debugging circuit and method that solves the above problems.

BRIEF DESCRIPTION OF THE DRAWINGS

The present invention is illustrated by way of example and not limited by the accompanying figures, in which like references indicate similar elements, and in which.

Figure 1:
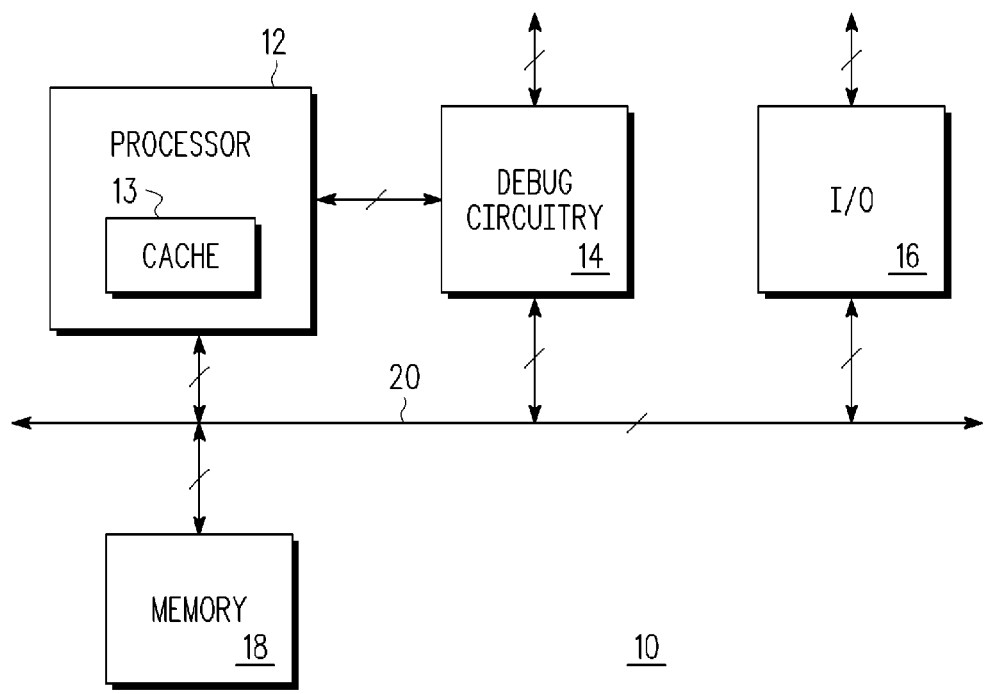
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Generally, the present invention provides, in one embodiment, a method and apparatus for showing a data block from a cache memory that is not directly visible on a system bus during a debugging operation. The data block is shown by making the data block available on a system bus. When shown, the data block cache status is not modified regardless of whether it is currently "dirty" or "clean". In one embodiment, the method is implemented as an instruction in a data processing system. The instruction causes the data block to be exposed to the system bus where it can be captured by a debugging circuit, such as an IEEE ISTO-5001 compliant Nexus™ debugging unit. Nexus™ is a trademark of Freescale Semiconductor, Inc. located in Austin, Tex. The current state of the cache is not affected, including data tag and status information associated with each cache entry, as well as all replacement location logic used to determine an entry to next be replaced on a cache miss. Also, if the value is not in the cache, the value can be retrieved from the system external to the cache so that it is made visible to the debugging circuit, without having the value written to the cache. The instruction allows real-time debugging circuits to be able to view the current value of one or more variables in memory that may be hidden from access due to cache hierarchy without modifying the value or impacting the current state of the cache.

Normally, prior art systems utilize a series of memory access instructions such as load and store instructions, or utilize one or more cache management instructions, such as a block flush instruction, to cause operand values contained in one or more memory locations (which may be cached) to be made visible to a real-time debug unit so that the values can be captured and messaged out externally to the user of the system for debugging purposes. However, these prior art methods interact with a cache or caches in the system and cause normal activity such as cache line replacements and allocations, and state changes to cache line status to occur, which intrusively modify the state of the system. This intrusive modification is not desirable, since it interacts with the normal activity of the system which would have occurred if no debugging activity was performed, and this interaction may cause numerous unintended side-effects.

In one aspect there is provided a method for operating a processor coupled to a system bus and having a cache. The method comprises: receiving an instruction which indicates an effective address; and executing the instruction, wherein executing the instruction comprises: determining if the effective address results in a hit or a miss in the cache; and when the effective address results in a hit, providing data associated with the effective address from the cache to the system bus without modifying a state of the cache.

In another aspect there is provided a method for operating a processor coupled to a system bus and having a cache, the method comprising: receiving an instruction which indicates an effective address; determining that the effective address results in a hit in the cache, wherein determining comprises identifying a hit entry in the cache associated with the effective address; and when a dirty bit of the hit entry indicates that data stored in the hit entry is clean, providing at least a portion of the data stored in the hit entry from the cache to the system bus.

In yet another aspect there is provided a method for operating a processor having a table look-aside buffer (TLB). The method comprises: receiving an instruction which indicates an effective address and which includes a TLB exception indicator; providing the effective address to the TLB; when the effective address results in a miss in the TLB, selectively taking an exception based on the TLB exception indicator; and when the effective address results in a hit in the TLB, providing a translated address from the TLB corresponding to the effective address.

In yet another aspect there is provided a data processing system that comprises a processor having a cache, the processor coupled to receive and execute instructions from debug circuitry. The cache comprises a cache array storing a plurality of cache entries and cache control circuitry. The cache control circuitry is coupled to the cache array and determines if an effective address indicated by an instruction received from the debug circuitry results in a hit or a miss in the cache array. When the effective address results in a hit, the cache control circuitry enables the cache array to provide data associated with the effective address to a system bus coupled to the processor and the debug circuitry without modifying a state of the cache array.

FIG. 1 illustrates, in block diagram form, a data processing system 10 in accordance with one embodiment of the present invention. Data processing system 10 includes a processor 12, a debug circuit 14, an input/output (I/O) 16, and a memory 18, all bi-directionally coupled to a bus 20.

Note that in one embodiment, all of data processing system 10 may be located on a single integrated circuit or within a same device. Alternatively, data processing system 10 may include any number of separate integrated circuits or separate devices interconnected with each other. For example, in one embodiment, the memory 18 may be located on one or more integrated circuits, separate from the rest of data processing system 10.

The memory 18 may be any type of memory, such as, for example, a read only memory (ROM), a random access memory (RAM), non-volatile memory (e.g. Flash), etc. Also, memory 18 may be a memory or other data storage located within another peripheral or slave or on a different integrated circuit.

In one embodiment, processor 12 and debug circuitry 14 are bus masters. In one embodiment, processor 12 is a processor capable of executing instructions, such as a microprocessor, digital signal processor, etc., or may be any other type of bus master, such as for example, a direct memory access (DMA) controller, or the like. Note that other slave devices may be included in data processing system 10 that are not illustrated in FIG. 1, such as for example, another memory coupled to bus 20, as well as any type of peripheral circuit which resides on the system bus or coupled to I/O circuit 16.

Processor 12 includes a cache 13. Cache 13 functions as a level one (L1) cache for storing data and/or instructions for use by processor 12. Typically, data and/or instructions are loaded into cache 13 from memory 18 before being executed by the processor. Cache 13 may comprise a separate data cache and a separate instruction cache. Cache 13 comprises one or more data arrays, one or more tag arrays, and one or more status bit arrays. In some embodiments the tag and status information may be stored in a common array. Each cache entry consists of a block or line of data, a tag value which associates the data with a memory address, and status information, including whether the cache entry is valid, whether the cache entry is "dirty", i.e. modified with respect to the data associated with the same address in memory 18 or other external memory blocks if present, and other associated status information. In one embodiment, memory 18, or a portion of memory 18 may be characterized as a level two (L2) cache.

An input/output (I/O) module 16 is bi-directionally connected to the bus 20 and to external circuitry (not shown). The I/O module 16 includes various interface circuits depending upon type of external circuitry that is connected to the I/O module 16. 1/0 module 16 may optionally contain one or more alternate bus masters coupled to bus 20.

Debug circuit 14 is bi-directionally connected to bus 13 and to processor 12 via bus 15. Debug circuit 14 is also bi-directionally connected to external circuitry (not shown) such as a hardware tester or other debugging interface hardware.

In general, debug circuitry 14 functions as a diagnostic check for data processing operations related to an access to cache 13, memory 18, and I/O module 16, and in other embodiments, other types of data retention circuits utilized by data processing system 10 whether internal to or external to data processing system 10. The processor 12 and alternate bus masters obtain mastership of the system bus 20 as needed and selectively access the system memory 18 to retrieve and store data and instructions. Debug circuitry 14 may be configured by the user of data processing system 10 to capture the values of one or more memory locations by monitoring addresses presented on bus 20, and capturing or sampling the related data values presented on bus 20. During bus read operations, the data values are provided by a selected slave device such as memory 18. During bus write operations, the data values are provided by a bus master of bus 20 such as processor 12. As the bus transfers occur, debug circuitry 14 monitors each transfer and selectively captures data values corresponding to data locations the user of debug circuitry 14 wishes to monitor. These values and conditions may be programmed into and transferred from debug circuitry 14 via the terminals shown in FIG. 1.

Certain limitations in prior art systems are overcome by the current invention. In prior art systems, if a data variable or value is located within cache 13, the data value may be modified with respect to the corresponding value in memory 18, i.e. the latest (most up to date) value is not present in memory 18, but only within cache 13. If debug circuitry 14 accesses memory 18 to obtain the desired variable's value, it will not get a correct copy, since the copy may be modified internally in cache 13.

An instruction is provided in data processing system 10 to allow debug circuitry 14 to "see" a value which may be stored in cache 13. The instruction is herein after referred to as a "data cache block show" instruction and includes an effective address corresponding to the value. The instruction is executed by the processor. It is determined if the effective address results in a "hit" or a "miss" in the cache. When the effective address results in a hit, the value is provided to bus 20 associated with the effective address from the cache 13. Debug circuitry 14 then has access to the value from the bus 20 as it is provided by the processor. In one embodiment, debug circuitry 14 monitors transactions on bus 20, and is capable of sampling the address and associated data values as bus transfers occur. Desired values can then be transferred after sampling to a user of the system performing a debugging operation by means of signals from debug circuitry 14 of FIG. 1. A state of cache 13 is not modified when the value is placed on the bus 20. In prior art systems, it is not possible to place the value of the data variable on bus 20 from cache 13 when a cache hit occurs, since the cache satisfies the prior art load or store request generated by a normal load or store instruction. This causes an issue for debug circuitry 14, since the value is not made visible on bus 20 for capture. When the effective address results in a miss, one feature of the instruction allows the value to be retrieved from another memory, such as for example, memory 18. If value is retrieved from another memory, the value is placed on bus 20 by the memory during retrieval, allowing access to the value by debug circuitry 14. Note that the value is not then stored in cache 13 as required by normal load and store instruction misses. The value is discarded after being shown on bus 20. By discarding the value and not allocating a replacement cache entry as is done for normal cache misses incurred by normal load and store instructions, the result of executing the data cache block show instruction has minimal effect on the state of the cache, thus simplifying debug of the system, since the debug operation is minimally intrusive. Cache lines are not replaced on misses, and no state changes occur to the status bits, data, or tag information contained in the cache. In addition, regardless of hit or miss outcome, the state of one or more cache line replacement algorithm state variables remain unchanged, such as least recently used status bits, etc.

Typically, some data values are subject to change and are updated in response to executing instructions. In some debugging situations it may be desirable to retrieve the latest version of the value even when resident in the cache. A "dirty bit" is associated with a cache entry indicates whether or not data in the cache associated with the effective address is different (i.e. has been modified) from data stored at another memory location, such as memory 18, corresponding to the effective address. In accordance with the disclosed embodiment, a "dirty bit" associated with the effective address of the value is not modified when the value is retrieved from the cache and presented to the system bus 20 in response to executing the data cache block show instruction. Likewise, cache 13 is not modified if the value associated with the effective address in cache 13 is the same as the value in another memory location, i.e. the data is clean. In other words, even when a dirty bit of the hit cache entry indicates that data stored in the entry is clean, the data stored in the entry is provided to bus 20 and the entry is not modified. When a dirty bit of the hit cache entry indicates that data stored in the entry is dirty, the data stored in the entry is still provided to bus 20, and the entry is not modified, and the dirty bit is not cleared, unlike in prior art cache control instructions. The data cache block show instruction will be discussed in more detail below.

Figure 2:
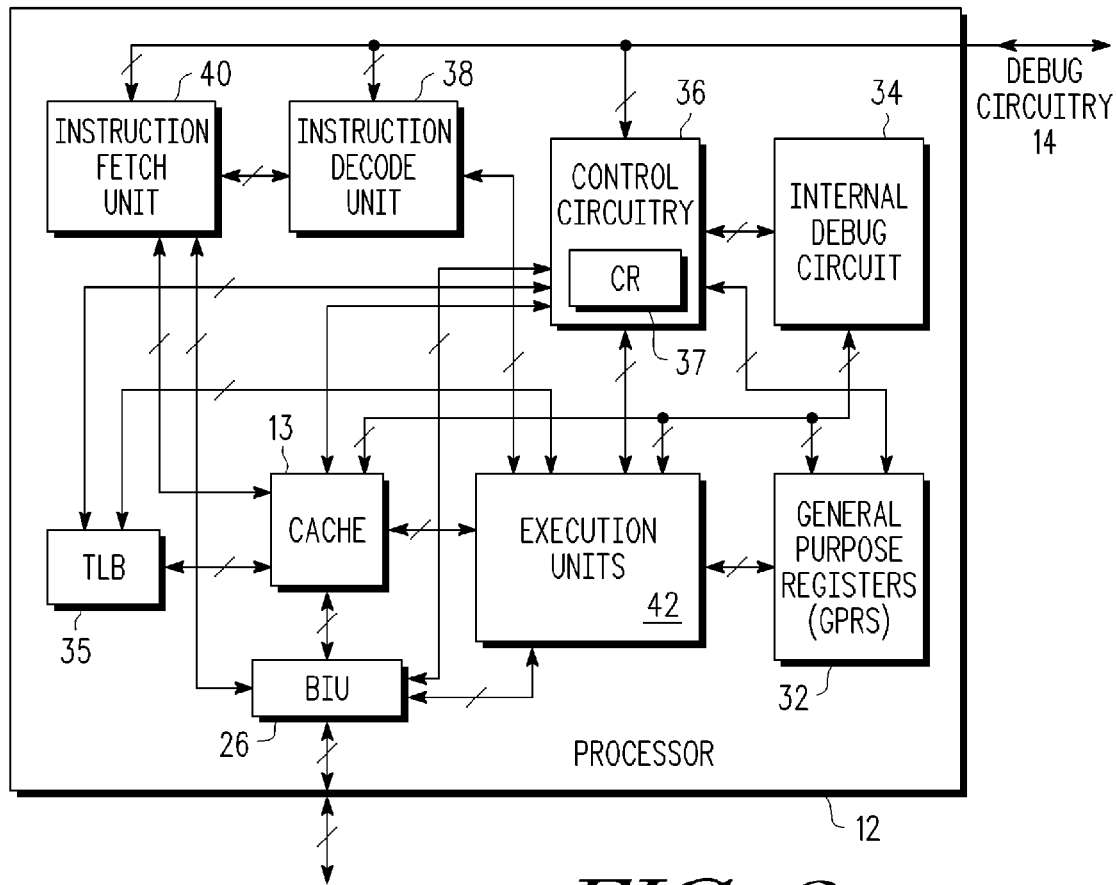
FIG. 2 illustrates, in block diagram form, a processor of the data processing system of FIG. 1.

FIG. 2 illustrates, in block diagram form, processor 12 of the data processing system 10 of FIG. 1. Processor 12 includes cache 13, bus interface unit 26, general purpose registers (GPRS) 32 translation look-aside buffer (TLB) 35, internal debug circuitry 34, control circuitry 36, instruction decode unit 38, instruction fetch unit 40, and execution units 42. Note that in the following description regarding the connections between blocks in FIG. 2, some of the various connections are repeated. Also, each of the various connections includes multiple conductors. In FIG. 2, cache 13 is bi-directionally coupled to control circuitry 36, to execution units 42, to instruction fetch unit 40, to TLB 35, to BIU 26, and to internal debug circuit 34. TLB 35 is bi-directionally coupled to control circuitry 36, to execution units 42, and to cache 13. Execution units 42 is bi-directionally coupled to cache 13, to instruction decode unit 38, to TLB 35, to control circuitry 36, and to GPRS 32. BIU 26 is bi-directionally coupled to cache 13, to instruction fetch unit 40, to control circuitry 36, to execution units 42, and to bus 20. GPRS 32 is bi-directionally coupled to control circuitry 36, and to execution units 42.

Internal debug circuit 34 is bi-directionally coupled to control circuitry 36. Control circuitry 36 is bi-directionally coupled to instruction fetch unit 40, to instruction decode unit 38, to TLB 35, to cache 13, to BIU 26, to execution units 42, to internal debug circuit 34, and to GPRS 32. Control circuitry 36 includes a condition register 37. Condition register 37 generally reflects results of instruction execution. Typically, these include relational values set as the result of an arithmetic, logical, or comparison operation instruction. In addition, in one embodiment, condition register 37 may be updated with status reflected during operation of the data cache block show instruction. For example, when the data cache block show instruction is provided by, for example, debug circuitry 14 for execution by processor 12, an error may occur during the attempted execution of the instruction. The condition register 37 comprises one or more error update indicators that can be updated by processor 12 in response to an error occurring during execution of the instruction. Instruction decode unit 38 is bi-directionally coupled to debug circuitry 14, to instruction fetch unit 40, and to execution units 42. Instruction fetch unit 40 is bi-directionally coupled to debug circuitry 14, to instruction decode unit 38, to cache 13, and to BIU 26. Each of instruction fetch unit 40, instruction decode unit 38 and control circuitry 36 are directly coupled to debug circuitry 14. Note that in other embodiments, processor 12 may have different processing blocks and the connections between the blocks may be different.

Figure 3:
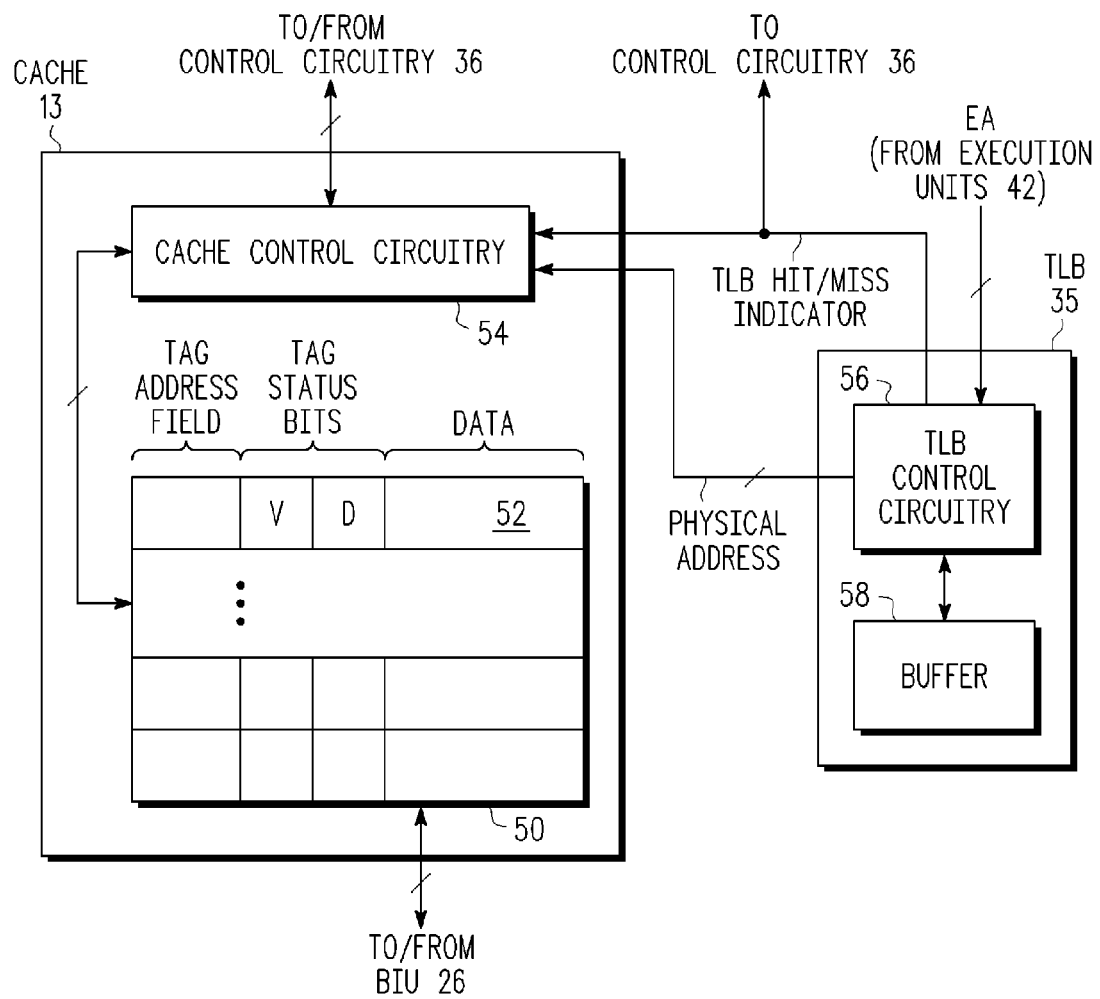
FIG. 3 illustrates, in block diagram form, a portion of the processor of FIG. 2.

FIG. 3 illustrates, in block diagram form, cache 13 and TLB 35 of the processor 12 of FIG. 2 in more detail. Cache 13 includes cache control circuitry 54 and cache array 50. TLB 35 includes TLB control circuitry 56 and buffer 58. Cache array 50 is an array of random access memory cells organized as a plurality of entries. In one embodiment, cache array 50 comprises SRAM (static random access memory) memory cells. In other embodiments, other memory types are suitable. In FIG. 3, entry 52 is representative of the plurality of entries and includes a TAG address bit field labeled "TAG ADDRESS FIELD", a TAG status bit field labeled "TAG STATUS BITS" and a data bit field labeled "DATA". The TAG status bit field includes a valid bit labeled "V" and a dirty bit labeled "D". Each entry may be referred to as a "cache line" for processor 12. Cache array 50 is bi-directionally coupled to both cache 3 0 control circuitry 54 and to bus 20 via BIU 26. Cache control circuitry 54 is bi-directionally coupled to control circuitry 36. Cache control circuitry 54 determines if an effective address pointed to by an instruction received from, for example, cache 13, memory 18, or debug circuitry 14 is a hit or a miss in cache 13. In TLB 35, buffer 58 is bi-directionally coupled to TLB control circuitry 56 and is for storing physical addresses that correspond to the effective addresses from execution units 42. TLB control circuitry 56 is coupled to both control circuit 36 and to cache control circuitry 54 for providing a TLB hit or miss indicator. TLB control circuitry 56 is also coupled to cache control circuitry 54 for providing a physical address corresponding to an effective address (EA). Address translation from an effective address to a physical address is performed by TLB 35 in a standard manner as is known in the art. Cache control circuitry 54 determines if an effective address pointed to by an instruction results in a hit or miss by comparing the physical address for an access provided by TLB 35, to the stored value(s) contained in one or more tag entries in cache array 50. In some embodiments, TLB 35 is optional, and if not present, the effective address (EA) is provided directly to cache 13 without translation. In such embodiments, stored tag values correspond directly to effective addresses without address translation to a physical address occurring.

Figure 4:
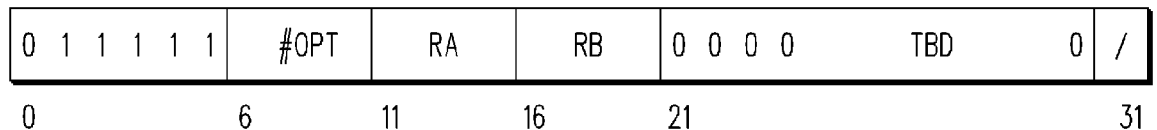
FIG. 4 illustrates an instruction bit field in accordance with the present invention.

FIG. 4 illustrates a data cache block show instruction bit field 60 in accordance with the present invention. The data cache block show instruction can be issued by any bus master of data processing system 10. In the illustrated embodiment, the data cache block show instruction is issued by debug circuitry 14. In other embodiments, one or more data cache block show instructions may be stored in program memory locations contained in memory 18, or elsewhere within data processor 10, and may be retrieved by processor 12 as a part of normal instruction stream processing. In one embodiment, bits [0-5] of the instruction are used to identify the instruction as the data cache block show instruction. In the illustrated embodiment, bits [0-5] are 011111. In other embodiments, bits [0-5] may be different. In addition, in other embodiments, the number of bits in each bit field may be different. Bits [6-10] are labeled "#opt" and are for indicating which of five features are to be used with the instruction:

opt=[miss_fetch_true, signal_TLB_exceptions, size_of_show, mask_data_bkpt, record_status].

Bits [11-15], labeled "RA" and bits [16-20] labeled "RB" are the effective address offset and the effective address base register values, respectively, use to compute the effective address of the data to be made available on bus 20. Bits [21-30] labeled "TBD" are not used for this instruction. Bit [31] indicates the end of the instruction.

The data cache block show instruction is provided to force visibility of a potentially cached location to an agent external to the processor 12, for example, debug circuitry 14 for debug visibility purposes. No data breakpoint event occurs as part of the execution of this instruction if the option bit field #opt [mask_data_bkpt] of bits [6-10] indicates breakpoints should be masked. Normal load and store instructions continue to generate data breakpoint events if so enabled by internal debug circuitry 34 of FIG. 2. Watchpoint signaling is implementation dependent, and may also be controlled by internal debug circuitry 34 of FIG. 2 to generate watchpoint events when certain effective address matches for a data access occur. If the data block containing the byte addressed by an effective address is in the data cache of this processor and no TLB Miss or Protection violation occurs, the addressed data block is written to a memory higher in the memory hierarchy, such as for example, memory 18. When the instruction is executed, the state of the data block in cache 13 is not altered. The data block is written to bus 20 regardless of whether it is "dirty" or "clean".

The size of the data block written to bus 20 is determined by the feature #opt[size_of_show], where "size_of_show" is a data block size indicator. The data block "shown" by the instruction may be all of a cache line associated with an effective address or may be less than all of a cache line based on the size indicator. If the data block containing the byte addressed by the effective address is not in cache 13 and the feature #opt[miss_fetch_true] indicates that miss fetching should occur, the addressed block is fetched from another memory of the system, such as memory 18, to be made visible on bus 20 for capture by debug circuitry 14, and is discarded by processor 12. Otherwise, if #opt[miss_fetch_true] indicates no miss fetching is to occur, then the instruction is treated as a NOP (no operation) if a miss occurs and no data is provided to bus 20.

If #opt[signal_TLB_exceptions] is set as true, then the effective address is translated to a physical address by TLB 35 and the physical address used to determine if the effective address results in a hit or a miss. If a TLB Miss or TLB Protection violation occurs, it is signaled within processor 12, and exception processing is initiated to deal with the generated error condition. Conversely, if #opt[signal_TLB_exceptions] is set as false, TLB Miss and TLB Protection violations are ignored, and the instruction is treated as a NOP of one if these conditions is encountered, and no exception is taken. If TLB errors, bus errors, or other errors occur as part of the execution of this instruction, the errors are signaled via a status bit in the control register 37 if #opt[record_status] is set.

The feature #opt[signal_TLB_exceptions] can be used with other instructions besides the data cache block show instruction. When #opt[signal_TLB_exceptions] is set true, a effective address associated with an instruction is provided to TLB 35. When the effective address results in a miss in the TLB 35, an exception is taken based on the whether #opt [signal_TLB_exceptions] is set true or false. When the effective address results in a hit in TLB 35, a translated address is provided from TLB 35 for the effective address. When the effective address results in a miss in TLB 35 and the #opt [signal_TLB_exceptions] is set true, execution of the instruction will result in a TLB Miss exception being signaled, and appropriate exception processing activity is initiated by processor 12. When the effective address results in a miss in TLB 35 and the #opt[signal_TLB_exceptions] is set false, execution of the instruction will not result in a TLB Miss exception being signaled, and instead, a no-operation, or other default result will be processed by processor 12. In this manner, an instruction specifier can be used to condition whether a normally generated TLB exception condition will result in exception processing or will result in a default result being provided, such as a no-operation.

Note that the function of the data cache block show instruction is independent of whether the data block containing the byte addressed by an effective address is characterized as "write through required" or "caching inhibited". In either case, the execution of the data cache block show instruction causes the data value to be made visible on bus 20 for sampling or capture by debug circuitry 14, without affecting the state of the cache. It should be apparent now, that using the data cache block show instruction of the current invention causes the latest data value associated with a memory location to be made visible on the system bus for sampling or capture by debug circuitry, regardless of whether the associated memory location is resident or not in the cache, and if resident, regardless of the clean or dirty status of the data, and in the process of making the value visible, no current cache state, data, tag, or status is altered. Such control results in greatly improved ability to debug a system.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The terms a or an, as used herein, are defined as one or more than one. The terms including and/or having, as used herein, are defined as comprising (i.e., open language). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for operating a processor coupled to a system bus and having a cache, comprising:
   receiving an instruction which indicates an effective address and provides a breakpoint disable indicator; and
   executing the instruction, wherein executing the instruction comprises:
      selectively disabling data breakpoints during execution of the instruction based on the breakpoint disable indicator;
      determining if the effective address results in a hit or a miss in the cache; and
      when the effective address results in a hit, providing data associated with the effective address from the cache to the system bus without modifying a state of the cache.

2. The method of claim 1, wherein executing the instruction further comprises:
   when the effective address results in a miss, selectively providing data associated with the effective address from a memory to the system bus, wherein when the data associated with the effective address is provided from the memory to the system bus, the data associated with the effective address is not stored in the cache.

3. The method of claim 2, wherein when the effective address results in a miss, selectively providing data associated with the effective address from the memory to the system bus based on a fetch indicator provided by the instruction.

4. The method of claim 3, wherein when the fetch indicator indicates fetching and when the effective address results in a miss, data associated with the effective address is provided from the memory to the system bus.

5. The method of claim 4, wherein when the fetch indicator indicates no fetching and when the effective address results in a miss, data associated with the effective address is not provided from the memory to the system bus.

6. The method of claim 1, wherein when the effective address results in a hit, providing the data associated with the effective address from the cache to the bus without modifying the state of the cache comprises:
   providing the data associated with the effective address from the cache to the bus without modifying a dirty bit in the cache associated with the effective address, the dirty bit indicating whether or not the data associated with the effective address stored in the cache is different from data stored at a memory location in the memory corresponding to the effective address.

7. The method of claim 1, wherein when the effective address results in a hit, the data associated with the effective address that is provided from the cache to the system bus has a same value as data stored at a memory location in the memory corresponding to the effective address.

8. The method of claim 1, wherein receiving the instruction which indicates the effective address comprises receiving the instruction from debug circuitry coupled to the system bus.

9. The method of claim 1, wherein the instruction provides a size indicator, and wherein the data associated with effective address provided from the cache to the system bus comprises all of a cache line associated with the effective address or less than all of the cache line associated with the effective address, based on the size indicator.

10. The method of claim 1, wherein executing the instruction further comprises:
    translating the effective address to a translated address using a translation look-aside buffer (TLB), wherein determining if the effective address results in a hit or a miss in the cache comprises using the translated address to determine if the effective address results in a hit or a miss.

11. The method of claim 10, wherein the instruction provides a TLB exception indicator which indicates whether or not an exception is to be taken if the effective address results in a miss in the TLB.

12. The method of claim 1, wherein the instruction provides an error update indicator, and wherein the executing the instruction further comprises:
    based on the error update indicator, selectively updating a field in a condition register of the processor in response to an error occurring during execution of the instruction.

13. A method for operating a processor coupled to a system bus and having a cache, comprising:
    receiving an instruction which indicates an effective address, the instruction including a size indicator;
    determining that the effective address results in a hit in the cache, wherein determining comprises identifying a hit entry in the cache associated with the effective address; and
    when a dirty bit of the hit entry indicates that data stored in the hit entry is clean, providing at least a portion of the data stored in the hit entry from the cache to the system bus, wherein a size of the at least a portion of the data is determined based on the size indicator.

14. The method of claim 13, when the dirty bit of the hit entry indicates that the data stored in the hit entry is clean, the data stored in the hit entry of the cache is unmodified with respect to data stored at a memory location in a memory coupled to the system bus, the memory location corresponding to the effective address.

15. The method of claim 13, further comprising:
    when the dirty bit of the hit entry indicates that data stored in the hit entry is dirty, providing at least a portion of the data associated with the effective address from the cache to the system bus.

16. The method of claim 15, wherein the at least a portion of the data associated with the effective address stored in the hit entry is provided from the cache to the system bus without modifying the dirty bit of the hit entry.

17. The method of claim 13, when the dirty bit of the hit entry indicates that data stored in the hit entry is clean, the at least a portion of the data stored in the hit entry is provided from the cache to the system bus without modifying the dirty bit of the hit entry.

18. A method for operating a processor having a table look-aside buffer (TLB), the method comprising:
    receiving an instruction which indicates an effective address and which includes a TLB exception indicator;
    providing the effective address to the TLB;
    when the effective address results in a miss in the TLB, selectively taking an exception based on the TLB exception indicator; and
    when the effective address results in a hit in the TLB, providing a translated address from the TLB corresponding to the effective address.

19. The method of claim 18, wherein when the effective address results in a miss in the TLB and the exception is taken based on the TLB exception indicator, the method further comprises processing the exception to provide a translated address corresponding to the effective address.

20. The method of claim 19, wherein when the effective address results in a miss in the TLB and the exception is not taken based on the TLB exception indicator, the method further comprises treating the instruction as a no-operation (NOP) instruction.

21. The method of claim 19, wherein when the effective address results in a miss in the TLB and the exception is not taken based on the TLB exception indicator, no translated address is provided for the effective address in response to the instruction.

22. A data processing system comprising:
- a processor having a cache, the processor coupled to receive and execute instructions from debug circuitry, the cache comprising:
  - a cache array storing a plurality of cache entries; and
  - cache control circuitry coupled to the cache array, the cache control circuitry determining if an effective address indicated by an instruction received from the debug circuitry results in a hit or a miss in the cache array, and wherein:
- when the effective address results in a hit, the cache control circuitry enables the cache array to provide data associated with the effective address to a system bus coupled to the processor and the debug circuitry, without modifying a state of the cache array, and
- when the effective address results in a miss, the processor selectively enables a fetch of the data associated with the effective address from a memory coupled to the system bus, wherein when the processor enables the fetch of the data associated with the effective address from the memory to the system bus, the data associated with the effective address is not stored in the cache array.

* * * * *